(12) United States Patent
Trifilo

(10) Patent No.: US 6,975,085 B1
(45) Date of Patent: Dec. 13, 2005

(54) ELECTRONIC MOTOR BRAKE

(75) Inventor: Timothy M. Trifilo, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 10/950,782

(22) Filed: Sep. 27, 2004

(51) Int. Cl.[7] .............................................. H02P 1/00
(52) U.S. Cl. ...................... 318/380; 318/375; 318/377; 318/378
(58) Field of Search ............. 318/370–382; 361/23–32

(56) References Cited

U.S. PATENT DOCUMENTS

| | | | |
|---|---|---|---|
| 4,767,970 A | | 8/1988 | Rodal |
| 5,184,049 A | | 2/1993 | Kiuchi |
| 5,208,741 A | * | 5/1993 | Kumar ........................ 363/124 |
| 5,386,185 A | * | 1/1995 | Beck et al. .................. 318/762 |
| 5,789,885 A | * | 8/1998 | Seel ............................ 318/375 |
| 5,847,522 A | | 12/1998 | Barba |
| 5,914,576 A | | 6/1999 | Barba |
| 6,094,024 A | * | 7/2000 | Westlake ..................... 318/375 |

OTHER PUBLICATIONS

Biamonte et al. "A Highly Integrated Single DSP Solution for Multiple Motor Drive Controls", no date.

* cited by examiner

*Primary Examiner*—Paul Ip
(74) *Attorney, Agent, or Firm*—Lynn L. Augspurger; Andrew J. Wojnicki, Jr.; Daryl K. Neff

(57) ABSTRACT

According to an aspect of the invention, an electronic motor brake is provided which includes a braking circuit including one or more discharge devices connectable to one or more of a plurality of power supply lines carrying respective phases of a power supply for driving a direct current (DC) motor. Such electronic motor brake further includes an activation circuit driven by current returning from the motor through one or more of the power supply lines. The activation circuit is operable upon disconnecting the braking circuit from the plurality of power supply lines to activate the discharge devices of the braking circuit to brake the motor.

20 Claims, 4 Drawing Sheets

ELECTRONIC MOTOR BRAKE

BACKGROUND OF THE INVENTION

The present invention relates to electric motor systems, and more specifically to a braking mechanism for an electric motor.

Electric motors are used in a variety of applications ranging from simple kitchen equipment to complex naval systems. Safety is an important concern with some electric motors, because of their rotational momentum and the materials, particularly rigid materials, of which their moving parts are made. This is especially so for high velocity motors used to drive fans. Some such motors drive fans having exposed blades in normally enclosed environments where serious injury could result if the fan blades are contacted in operation. In an existing approach to such concern, an interlock is provided that removes the power from the fan motor whenever the closed environment is opened. However, depending on the momentum of the motor, a significant delay can result in stopping the fan upon removal of power. Hence, by this approach the interlock is only partly effective in preventing a mishap. The system having the fan still poses a risk of injury if the fan is contacted too soon after the interlock is opened upon opening the closed environment.

Some other ways that this concern has been addressed include systems that apply mechanical braking to the motor. Such systems only operate when the motor is in service for normal operation. If the motor is removed for servicing, the mechanical braking is no longer present, and the safety concern is left unaddressed. In another approach, a voltage supply line is connected to the motor through an engageable connector, the motor stopping when the connector becomes disengaged. However, while the motor is stopped upon disengaging the connector, the voltage supply line to the connector continues to remain live. Thus, the stopped motor gives one an unreasonable sense of safety since the connector continues to maintain the live supply line at some elevated voltage operative to stop the motor.

Accordingly, in view of the existing approaches, it would be desirable to provide a circuit capable of rapidly braking an electric motor without the need to maintain a live voltage at a connector and which can be provided with the motor in a brakeable motor unit to maintain braking capability even when the motor is being serviced.

SUMMARY OF THE INVENTION

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

According to an aspect of the invention, an electronic motor brake is provided which includes a braking circuit including one or more discharge devices connectable to one or more of a plurality of power supply lines carrying respective phases of a power supply for driving a direct current (DC) motor. Such electronic motor brake further includes an activation circuit driven by current returning from the motor through one or more of the power supply lines. The activation circuit is operable upon disconnecting the braking circuit from the plurality of the power supply lines to activate the discharge devices of the braking circuit to brake the motor.

According to another aspect of the invention, a method is provided for braking a direct current (DC) motor, which includes: generating an activation voltage upon disconnecting a plurality of motor supply lines of a motor from a plurality of power supply lines, the activation voltage generated by current returning from the motor through the plurality of motor supply lines. Such method further includes using the activation voltage to activate a plurality of discharge devices connected to respective ones of the motor supply lines to brake the motor by discharging the motor supply lines.

DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1A:
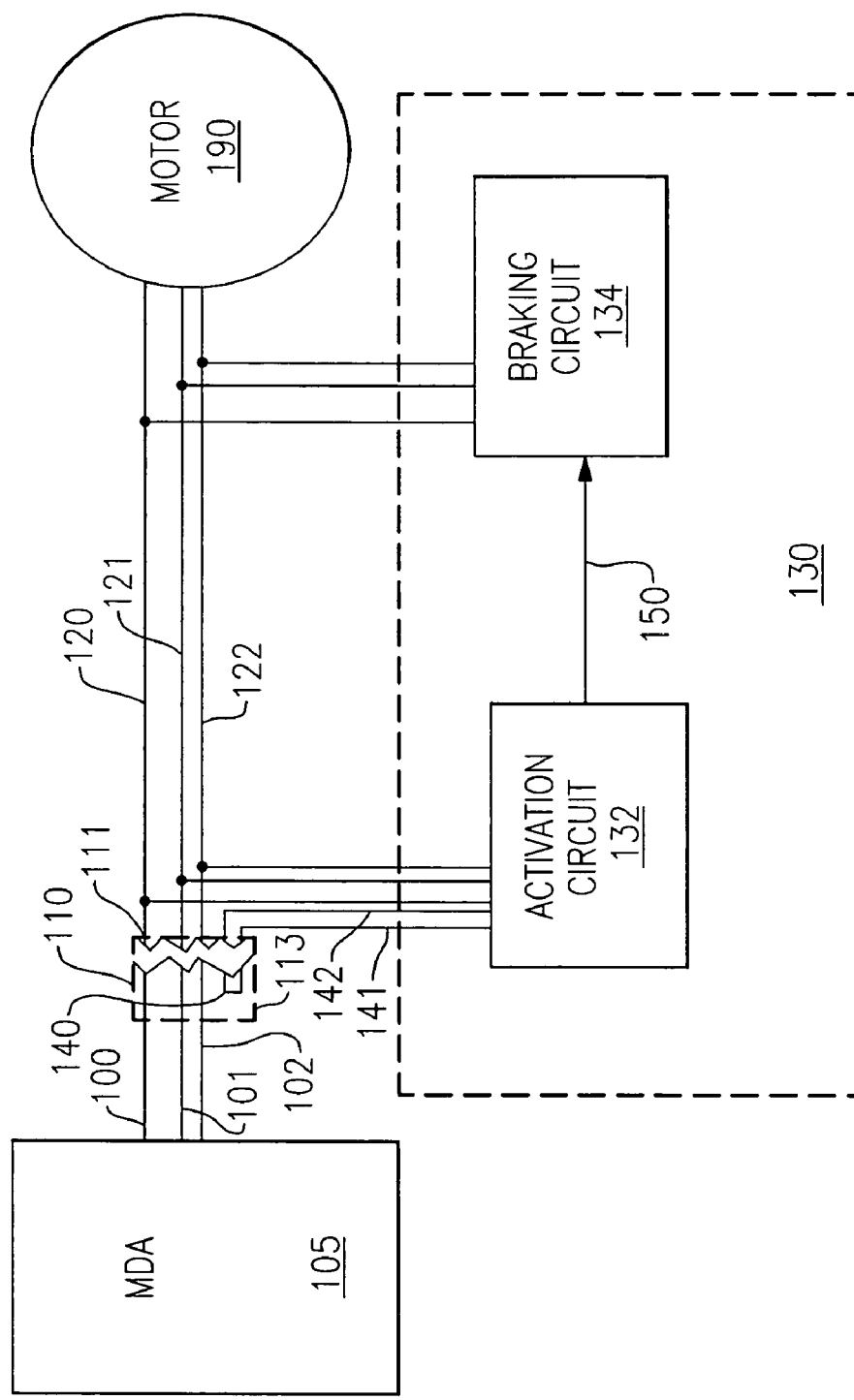
FIG. 1A schematically illustrates an electronic braking mechanism according to an embodiment of the invention, as installed for operation.

FIG. 1 is a block diagram illustrating an embodiment of the invention. As shown therein, a motor drive assembly (MDA) 105 is connected to an electric motor 190. In one embodiment, the motor 190 is brushless and is powered by multiple phase direct current (DC) power from MDA 105. Power is supplied from MDA 105 having a number of phases matching that needed by the motor. In one example, power is supplied from MDA at three different phases on MDA supply lines 100, 101 and 102 which are connected to motor supply lines 120, 121 and 122 through a mechanically engageable, e.g., pressure-fit, connector 110 joining the two sets of supply lines. As an example, the connector 110 may have a female piece 111 and a male piece 113, which are fitted together to engage the connector 110. In a particular embodiment, the motor 190 is used to drive an internal cooling fan of an electronic system such as a server computer system and the male and female pieces 111, 113 of the connector 110 are mounted to different panels of the electronic system.

As further shown in FIG. 1, an electronic braking mechanism 130 is coupled to the motor 190 on the same side of the connector 110 as the motor supply lines. The electronic braking system is operable upon disengagement of the connector 110 to automatically brake the motor 190 to a halt. When the connector 110 is engaged, the motor 190 is operable according to the amount of power supplied from MDA 105 through MDA supply lines 100, 101 and 102 to the motor supply lines 120, 121 and 122 through connector 110. However, whenever the male and female pieces 111, 113 of the connector 110 become disengaged from each other when power is being supplied by MDA 105, the braking mechanism automatically brakes the motor 190 to a halt.

The electronic braking mechanism includes an activation circuit 132 and a braking circuit 134. The activation circuit 132 is operable to activate the braking circuit the motor supply lines 120, 121 and 122 becoming disconnected from the MDA supply lines 100, 101 and 102. When activated by the activation circuit, the braking circuit quickly discharges the voltages on the motor supply lines 120, 121 and 122.

The braking mechanism 130 operates robustly, being powered by current returning from the motor 190 after the connector 110 is disengaged, thus needing no other source of power and not requiring a live voltage to be maintained at the connector 110. As will be described more fully below, the activation circuit 132 is driven by current returning from the motor 190 through one or more of the motor supply lines 120, 121, and 122.

As further shown in FIG. 1, the connector 110 includes a wrapped connection 140 for closing a loop including wrap lines 141 and 142 extending from activation circuit 132. When the connector 110 becomes disengaged, the open loop condition of lines 141 and 142 causes the activation circuit 132 to generate an activation voltage, which is then supplied on line 150 to activate the braking circuit 134.

Electronic systems, especially advanced systems having high circuit density and which operate at high speeds, have a great need to dissipate heat. Many times, little room within such systems for cooling devices. Consequently, many such systems use small high-speed cooling fans to maintain temperatures within tolerances, some fans which may need to operate at very high speeds, e.g., multiple tens of thousands of revolutions per minute (rpm), in order to produce the required airflow. As discussed above, the need to protect personnel from being harmed by such fans when servicing such electronic systems poses special challenges. In some prior art systems, cage-like structures known as "safety cages" are used to protect personnel from contacting the moving parts of such fans. Unfortunately, safety cages can constrict air flow, thus diminishing the effectiveness of the fan, and potentially defeating the purpose for which the fan is used. Accordingly, in the embodiments of invention described herein, a braking mechanism is provided which is activatable upon the opening of a panel, e.g., a door, cover, or other opening, of an electronic system. As an example, the braking system is activatable upon disengagement of a connector, the connector engaging when the panel is closed and the connector automatically disengaging when the panel is opened.

Figure 1B:
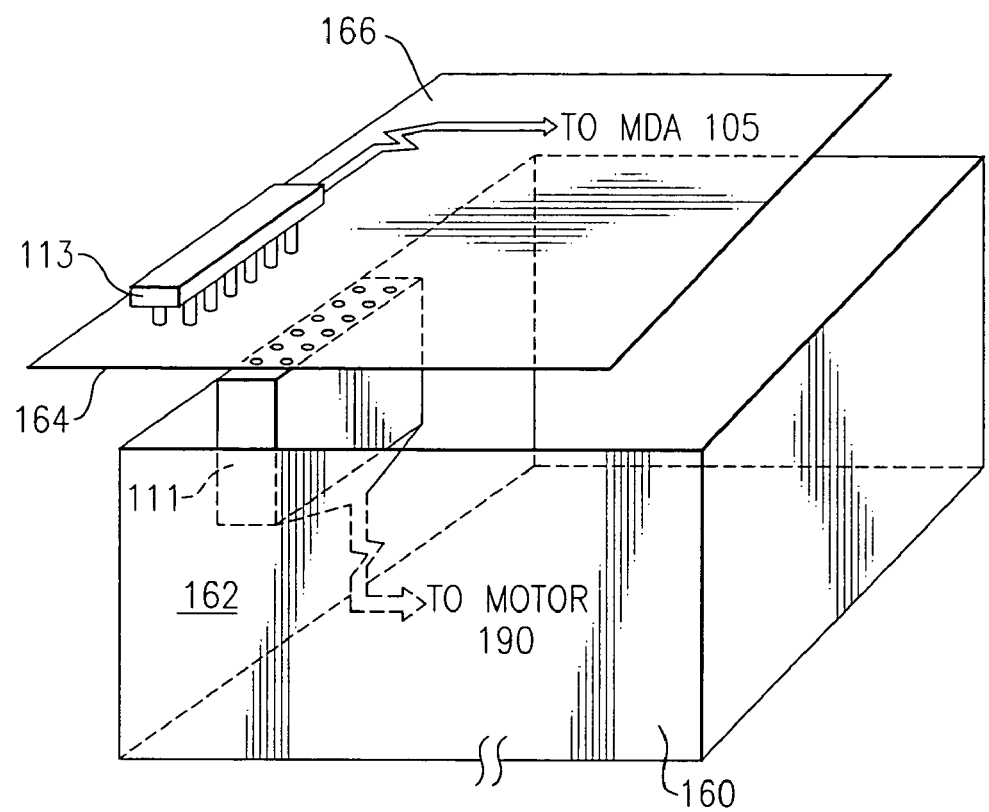
FIG. 1B illustrates placement of a connector in an electronic system for use in engaging and disengaging an electronic braking mechanism.

The automatic engagement and disengagement of the braking mechanism 130 by connector 110 is best seen in the illustrative diagram provided in FIG. 1B. As shown therein, a female piece 111 of the connector is mounted to an inside surface 162 of a side panel of an electronic system 160, which may be a rack-mounted system, for example. The mating portion of the connector, the male piece 113, is mounted to the underside 164 of a top panel 166 of the electronic system 160. The male piece includes a plurality of pins, fins or plug members, while the female piece includes a plurality of holes, slots or mating locations arranged to mate with the pins, fins or plug members of the male piece. Alternatively, each piece 111, 113 can have some pins, fins or plug members as well as some holes, slots or mating locations and be arranged to mate with the corresponding other one of the pieces 111, 113, such that neither piece is strictly classifiable as a "male piece" or a "female piece." With the two portions of the connector arranged as such, when the top panel 166 is closed, the male piece 113 of the connector remains engaged with the female piece 111. On the other hand, when the top panel 166 is opened, the male piece 113 of the connector becomes disengaged from the female piece 111.

Figure 2:
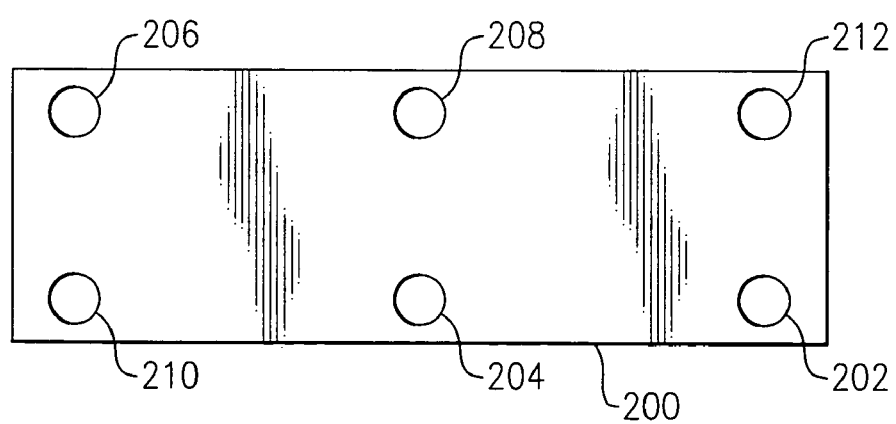
FIG. 2 illustrates an embodiment including a face of a mating piece of a connector.

FIG. 2 further illustrates one mating piece, e.g., a female piece 200 of a connector provided according to an embodiment of the invention. As illustrated therein, the piece includes a ground socket 202, as well as sockets 204, 206 and 208 for connecting each of the MDA supply lines to the respective motor supply lines. Sockets 210 and 212 connect wrap lines 141, 142 (FIG. 1) of the activation circuit to the wrap connection in the corresponding male piece (not shown) of the connector. As mentioned above and described in greater detail below, the engagement of the male and female pieces of the connector allows the motor to operate and preserves the electronic braking mechanism in the unactivated state. Disengagement of the male piece from the female piece activates the braking mechanism. The placement of the two sockets in the wrap connection loop at opposite corners of the female piece helps to ensure that the wrap connection is quickly and reliably broken whenever the respective panels to which the two pieces are mounted are moved toward an open position.

Figure 3:
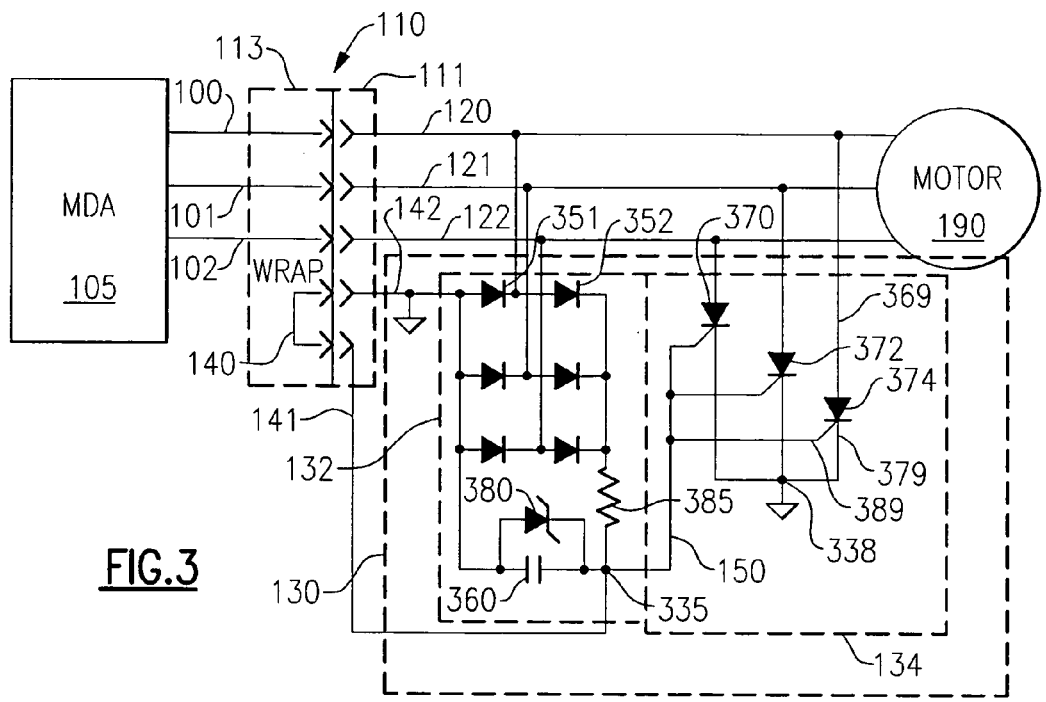
FIG. 3 schematicaly illustrates an electronic braking mechanism according to a second embodiment of the invention.

FIG. 3 is a detailed diagram further illustrating the embodiment shown in FIGS. 1A, 1B and 2. As shown in FIG. 3, the motor 190 is powered through motor supply lines 120, 121 and 122, which are connected by connector 110 to power supply lines 100, 101 and 102, each power supply line carrying a different phase of a DC power supply of motor drive assembly (MDA) 105. Each phase of the power supply switches at intervals between a first voltage, i.e., low voltage and a second voltage, i.e., higher voltage. The respective phases of the power supply are offset from each other in phase such that they each switch at different times between a low voltage such as ground, and a higher voltage such as a fixed DC level, e.g., 12 V. At any point in time, the voltage of one or two of the phases of the power supply is at the higher level while the other one or two of the phases is at the low level. Illustratively, the higher level is a positive voltage, while the lower level is a negative voltage.

As shown in FIG. 3, the braking circuit 134 includes a plurality of discharge devices 370, 372 and 374, each discharge device being connected to a corresponding one of the motor supply lines 120, 121 and 122 for the purpose of discharging the voltage on that motor supply line whenever an activation voltage is presented to the discharge devices on line 150. In the particular embodiment shown in FIG. 3, the discharge devices include silicon controlled rectifiers (SCRs). An SCR is a three terminal device which can be integrated with other SCRs in one integrated circuit, or, alternatively, as a discrete device. The purpose of the SCRs in the braking circuit 134 shown in FIG. 3, is to function as extremely fast switches capable of switching on and off relatively high power loads. Comparing SCRs to other types of switches, while a mechanical switch can be cycled between on and off states several hundred times a minute only with difficulty, SCRs exist which can be switched on and off 25,000 times a second, taking only a few microseconds to turn on and a few microseconds to turn off.

SCRs operate in a similar manner to diodes, in that when the SCR is switched on, e.g., SCR 374, current is conducted and the voltage appearing at the anode 369 of the device matches or nearly matches the voltage which appears at the cathode 379. When the SCR 374 is switched off, for practical purposes, the SCR 374 is open-circuited between the anode 369 and the cathode 379.

In order for the SCR 374 to conduct, an activation voltage having a sufficient value must be presented at a control terminal 389 of the SCR which is known as a "gate." The activation voltage in typically in a range of several volts, such that the SCR 374 is not falsely triggered by momentary disturbances on line 150. While some aspects of SCR operation are similar to that of a diode, the SCR is different in that once the SCR is turned on by a sufficient voltage at the gate 389, the SCR remains turned on as long as a positive current flow is maintained between the anode 369 and the cathode 379. This is true, even if the voltage at the gate decreases after the SCR turns on.

As described above, the activation voltage that is presented on line 150 to the gates of the SCRS of the braking circuit 134 is produced by the activation circuit 132. The activation circuit 132 is powered by current returning from the motor 190 when the two pieces 111, 113 of the connector 110 are disengaged from each other. Such current is generated through the return electromotive force applied by the motor's rotational momentum to the motor supply lines 120, 121 and 122. Such current appears on the motor supply lines as phased voltage and current waveforms for a brief interval after the removal of the motor supply lines from the power supply lines 100, 101, 102 until the electronic braking mechanism 130 has stopped the motor 190.

As further shown in FIG. 3, the activation circuit includes three pairs of diodes, each pair being connected to one of the motor supply lines 120, 121, and 122 to rectify the output therefrom and to raise the voltage at an output node 335 of the circuit 132 through a current limiting resistor 385. One diode of each pair of diodes is connected between a wrap line, i.e., node 142, held at ground and the respective motor supply line, and another diode of each pair is connected between the respective motor supply line and the current limiting resistor 385 which is connected to the output node 335. With respect to motor supply line 120, a diode 351 is connected between the ground node 142 and the motor supply line 120 to prevent conduction between the motor supply line 120 and ground, such as for when the motor supply line 120 is at a negative level during a portion of its cycle. A second diode 352 is connected between the motor supply line 120 and the resistor 385 for passing the voltage to the resistor only when the voltage on motor supply line 120 enters the positive portion of the cycle.

The output node 335 of the activation circuit is connected to one piece 111 of the connector 110 through a wrap line 141, as discussed above. When the two pieces 111, 113 of the connector are engaged in normal operation to operate the motor 190, the wrap connection 140 through the connector 110 connects the output node 335 of the activation circuit 132 to the ground node 142, such that the output node 335 is held at ground.

However, once the pieces 111, 113 of the connector become disengaged, the output node 335 is disconnected from ground. This allows a capacitor 360 at the output node 335 to then be charged to a DC voltage, that voltage being provided on line 150 to the SCRs 372, 374, 376 to activate the braking circuit 134. With the positive current flows received from the motor supply lines 120, 121 and 122 through the rectifier diodes including diode 352, the capacitor 360 is then charged, causing the voltage at output node 335 to rise. At that time, the resistor 385 limits transient current flow between the motor supply lines and the output node to a safe level to prevent damage to the motor of the electronic braking mechanism. A reverse-biased zener diode 380, connected between the output node 335 and the ground node 142, is provided mainly as an additional safety mechanism for protecting against an over voltage condition in either the activation circuit 132 or the braking circuit 134. The zener diode 380 protects against the capacitor being charged to voltage, e.g., 10 V, which is higher than that considered safe for application to the gates of the SCRs 370, 372, and 374 of the braking circuit 134.

In operation, when the two halves 111, 113 of the connector are disengaged, the rectified power applied from the motor supply lines through resistor 385 to the output node 335 charges the capacitor 360 to a stable DC activation voltage. The activation voltage is applied through line 150 to the gates of the SCRs 370, 372, 374 which then activates them. The activated SCRs then cause the motor supply lines 120, 121 and 122 to discharge to ground 388. The discharged supply lines 120, 121, and 122, in turn, cause transient braking currents to flow between the motor's internal windings and ground, acting to quickly brake the motor to a halt. The rapid rise in the activation voltage and the rapidity with which the SCRs turn on allow the electronic braking mechanism 130 to brake the motor very quickly, in some cases, within less than one revolution of the motor.

Figure 4:
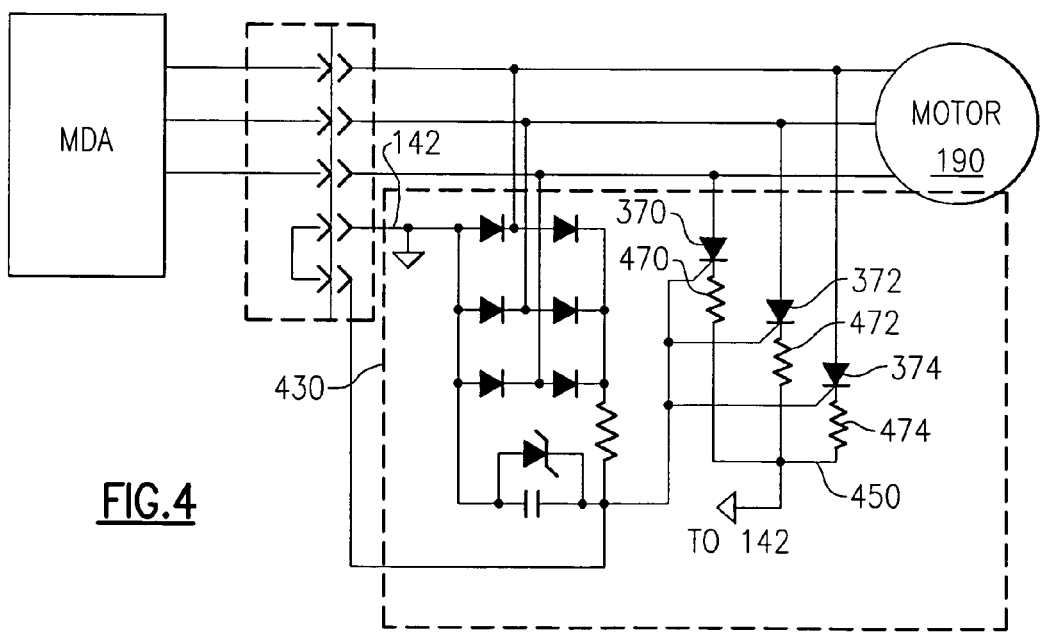
FIG. 4 schematicaly illustrates an electronic braking mechanism according to the third embodiment of the invention.

In an electronic braking mechanism according to another embodiment of the invention, the cathodes, e.g., 379 of the SCRs 370, 372, 374 are not grounded through a large, locally provided ground connection as shown at 338 in FIG. 3. Instead, in the embodiment of an electronic braking mechanism 430 as shown in FIG. 4, the cathodes of the SCRs are connected through respective resistors 470, 472, and 474 to a common node 450. The common node 450, in turn, is connected to a ground node 142 through a wire (not shown) having finite resistance and capacitance. This non-local grounding may allow the cathodes 370, 372, 374 of the SCRs to float to a positive transient voltage during some portion of the cycle of each respective motor supply line when the electronic braking mechanism 430 operates actively. In such case, a positive current flow across each SCR might not be maintained such that the one or more of the SCRs 370, 372, and 374 may turn off and on during the braking of the motor 190. However, since the motor supply lines 120, 121 and 122 carry voltages at different phases, when one of the SCRs turns off, the voltages and currents applied to one or both of the other SCRs may be sufficient to conduct, such that the braking action is continued on at least one of the motor supply lines at different points in time to stop the rotation of the mptor 190.

Figure 5:
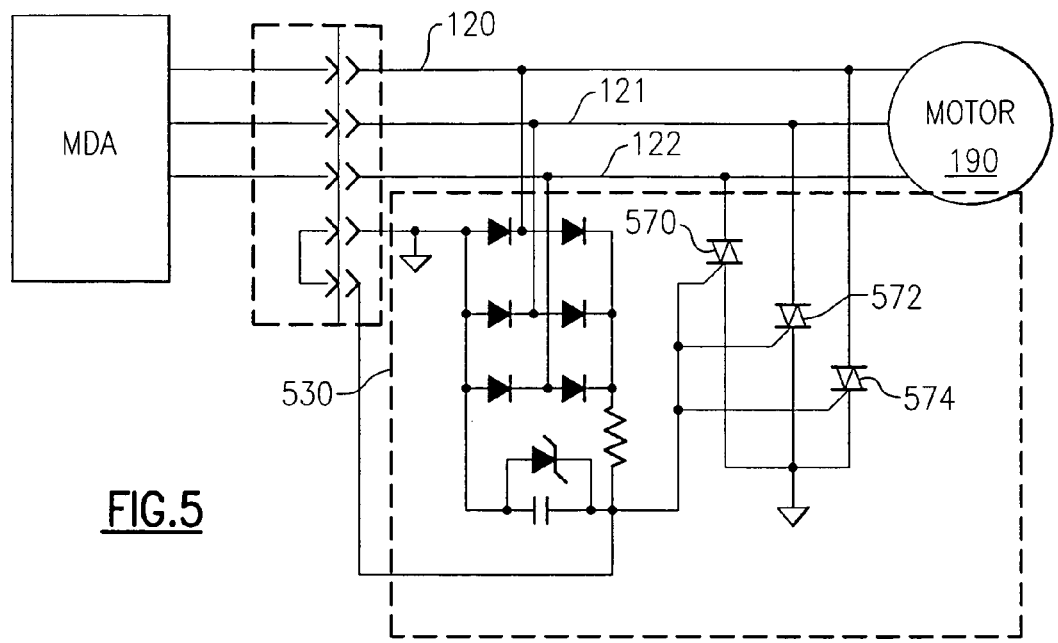
FIG. 5 schematicaly illustrates an electronic braking mechanism according to a fourth embodiment of the invention.

FIG. 5 illustrates an electronic braking mechanism 530 according to another embodiment of the invention. As shown in FIG. 5, the SCRs are replaced with triacs 570, 572, and 574 as the discharge devices. Triacs are similar to SCRs in operation in that a triac is activated by a sufficient activation voltage provided to a control terminal, a "gate" of the triac. Triacs differ from SCRs in that they conduct current in either a forward or a reverse direction, once activated by a sufficient gate voltage. Conceptually, a triac can be considered equivalent to two SCRs mounted in parallel, with one SCR placed in a forward direction in the circuit, and the other SCR placed in the reverse direction, the SCRs having gate terminals tied together in common. An advantage of using triacs 570, 572, 574 in the electronic braking mechanism 530 is faster halting of the motor 190. This is possible because the triacs provide a conduction point to ground regardless of whether the voltages on the motor supply lines 120, 121, 122 are positive or negative. In such manner, the braking function is applied to each motor supply line in both positive and negative portions of the power cycle on each supply line 120, 121 and 122.

Figure 6:
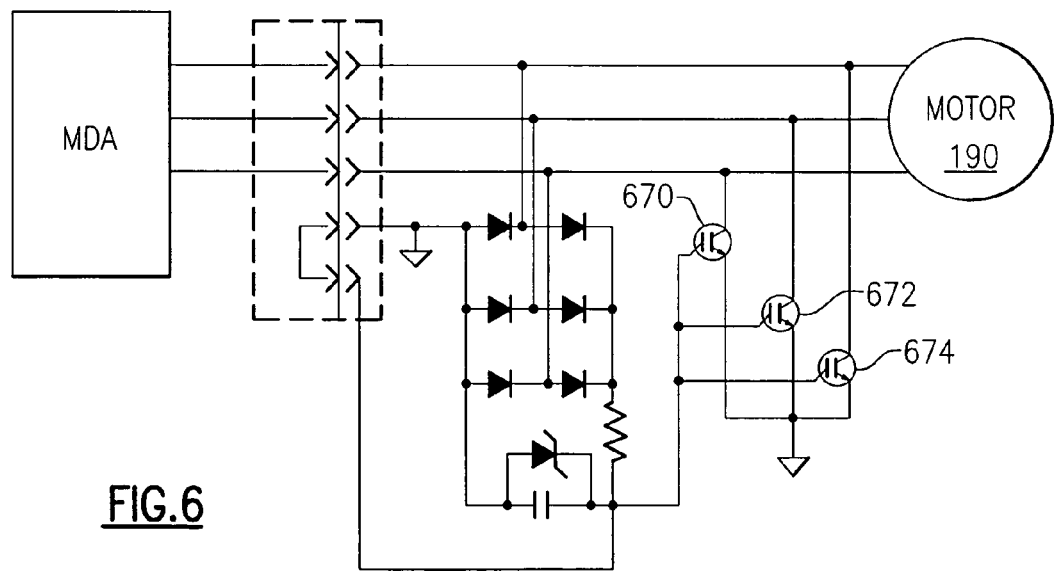
FIG. 6 schematically illustrates an electronic braking mechanism according to yet another embodiment, a fourth embodiment of the invention.

FIG. 6 illustrates an electronic braking mechanism 630 according to another embodiment of the invention in which insulated gate bipolar transistors (IGBTs) are utilized instead of SCRs or triacs. IGBTs can be used in place of SCRs to provide equivalent operation. IGBTs combine positive attributes of bipolar junction transistors (BJTs) and metal oxide field effect transistors (MOSFETs). Some IGBTs are sold in units having a diode connected in a direction between the emitter and collector, as a packaged component for use in place of a MOSFET. Such packaged IGBT-diode combinations are not suitable for use in the braking mechanism described herein because they do not operate in an equivalent manner to SCRs. Rather, IGBTs that do not have the additional diode are used as the discharge devices 670, 672, and 674 of the braking mechanism according to this embodiment of the invention.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. An electronic motor brake device, comprising:
   a braking circuit including one or more discharge devices connectable to one or more of a plurality of power supply lines carrying respective phases of a power supply for driving a direct current (DC) motor; and
   an activation circuit driven by current returning from the motor through one or more of the power supply lines, said activation circuit being operable upon disconnecting said braking circuit from the plurality of power supply lines to activate said discharge devices of said braking circuit to brake the motor.

2. The device as claimed in claim 1, wherein said activation circuit is operable to generate an activation voltage upon disconnecting said braking circuit, said activation voltage activating said one or more discharge devices.

3. The device as claimed in claim 2, wherein said activation circuit includes one or more rectifiers for use in generating the activation voltage.

4. The device as claimed in claim 3, wherein at least one rectifier is provided for each of the power supply lines.

5. The device as claimed in claim 3, wherein said activation circuit includes a capacitor, said activation circuit being operable to charge said capacitor with a voltage waveform rectified by said one or more rectifiers.

6. The device as claimed in claim 5, wherein said activation circuit further includes a current limiting resistor placed in series between said one or more rectifiers and said capacitor.

7. The device as claimed in claim 6, wherein a voltage on said capacitor is limited to a maximum voltage in accordance with a breakdown voltage of a zener diode.

8. The device as claimed in claim 1 wherein said one or more discharge devices include one or more silicon controlled rectifiers (SCR).

9. The device as claimed in claim 8, wherein said one or more discharge devices includes at least one SCR connected to each of said power supply lines.

10. The device as claimed in claim 1 wherein said one or more discharge devices include one or more triacs.

11. The device as claimed in claim 10, wherein said one or more discharge devices includes at least one triac connected to each of said power supply lines.

12. The device as claimed in claim 1 wherein said one or more discharge devices include one or more insulated gate bipolar transistors (IGBTs).

13. An electronic motor brake assembly including the electronic motor brake device as claimed in claim 1, and a DC motor.

14. The assembly as claimed in claim 13, wherein said motor is a sensorless motor.

15. The assembly as claimed in claim 14, wherein said motor is a sensored motor.

16. A method of braking a direct current (DC) motor, comprising:
    generating an activation voltage upon disconnecting a plurality of motor supply lines of the motor from a plurality of power supply lines, said activation voltage generated by current returning from the motor through said plurality of motor supply lines; and
    using said activation voltage to activate a plurality of discharge devices connected to respective ones of said motor supply lines to brake the motor by discharging said motor supply lines.

17. The method as claimed in claim 16, wherein said step of generating includes rectifying the current returning on said motor supply lines and charging a capacitor with said rectified current.

18. The method as claimed in claim 17, further comprising limiting a current that can be passed to said capacitor through a series current limiting resistor.

19. The method as claimed in claim 18, further comprising limiting a voltage on said capacitor to a maximum voltage in accordance with a breakdown voltage of a zener diode.

20. The method as claimed in claim 16 wherein said discharge devices include at least one of silicon controlled rectifiers (SCRs), triacs and insulated gate bipolar transistors (IGBTs).

* * * * *